United States Patent
Xu et al.

(10) Patent No.: US 12,307,242 B2
(45) Date of Patent: May 20, 2025

(54) METHOD FOR UPDATING ENCRYPTED FIRMWARE

(71) Applicant: REALTEK SEMICONDUCTOR CORPORATION, Hsinchu (TW)

(72) Inventors: Jun-Mei Xu, Suzhou (CN); Xiao-Dan Xu, Suzhou (CN); Xu-Liang Shen, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 159 days.

(21) Appl. No.: 18/210,301

(22) Filed: Jun. 15, 2023

(65) Prior Publication Data
US 2024/0220236 A1    Jul. 4, 2024

(30) Foreign Application Priority Data

Dec. 30, 2022  (CN) .......................... 202211720710.2

(51) Int. Cl.
*G06F 9/44* (2018.01)
*G06F 8/658* (2018.01)
*G06F 21/57* (2013.01)

(52) U.S. Cl.
CPC .............. *G06F 8/658* (2018.02); *G06F 21/57* (2013.01)

(58) Field of Classification Search
CPC ....................................................... G06F 8/658
USPC ......................................................... 717/168
See application file for complete search history.

(56) References Cited

U.S. PATENT DOCUMENTS

| 9,489,836 | B2 | 11/2016 | Huang et al. |
| 10,977,057 | B2 | 4/2021 | Shih et al. |
| 2013/0275956 | A1* | 10/2013 | Lai ............................ G06F 8/65 717/170 |
| 2017/0010821 | A1 | 1/2017 | Tsai et al. |
| 2021/0004223 | A1* | 1/2021 | Von Borany ............ G06F 8/658 |
| 2023/0067872 | A1 | 3/2023 | Xu |

FOREIGN PATENT DOCUMENTS

| CN | 113721967 A |   | 11/2021 |
| CN | 114675865 A | * | 6/2022 |
| TW | 201344576 A |   | 11/2013 |

(Continued)

OTHER PUBLICATIONS

OA letter of a counterpart TW application (appl. No. 112119157) on Feb. 22, 2024.

*Primary Examiner* — Evral E Bodden
(74) *Attorney, Agent, or Firm* — WPAT, PC

(57) ABSTRACT

A method for updating encrypted firmware is performed by a terminal device. The method includes the following steps: receiving an encrypted differential upgrade package or a differential upgrade package through a communication channel, wherein when the terminal device receives the encrypted differential upgrade package, the terminal device decrypts the encrypted differential upgrade package to obtain the differential upgrade package; decrypting an encrypted to-be-upgrade firmware of the terminal device to obtain a decrypted to-be-upgraded firmware; generating a decrypted target firmware according to the decrypted to-be-upgraded firmware and the differential upgrade package; and encrypting the decrypted target firmware to generate an encrypted target firmware, and storing the encrypted target firmware in the terminal device.

19 Claims, 2 Drawing Sheets

(56) References Cited

FOREIGN PATENT DOCUMENTS

| | | |
|---|---|---|
| TW | 201624933 A | 7/2016 |
| TW | 201702868 A | 1/2017 |
| TW | 1705374 | 9/2020 |

* cited by examiner

METHOD FOR UPDATING ENCRYPTED FIRMWARE

BACKGROUND OF THE INVENTION

1. Field of the Invention

The present disclosure relates to a method for updating firmware, especially to a method for updating encrypted firmware.

2. Description of Related Art

Generally, a terminal device (e.g., an embedded terminal device) has very limited calculation capability and memory resources. When the original firmware of the terminal device needs to be upgraded, this upgrade could be realized with an over-the-air technology (OTA). Methods for realizing the upgrade with the OTA include a whole package upgrade method and a differential upgrade method. Regarding the whole package upgrade method, the terminal device needs to download the whole new firmware (i.e., a whole upgrade package) to replace the original firmware of the terminal device; however, the size of the whole upgrade package is usually very large, and the terminal device usually needs to spend a lot of time to download the whole upgrade package and use a large amount of spared memory of the terminal device to store the package. Accordingly, the user experience is usually not good in regard to the whole package upgrade method, not to mention the terminal device may not have enough spared memory to temporarily store the whole upgrade package. Regarding the differential upgrade method, the terminal device needs to download a differential upgrade package that is generated according to the difference between the original firmware and the new firmware, and then uses the differential upgrade package to upgrade the original firmware of the terminal device. Since the size of the differential upgrade package is very small (e.g., the size of the differential upgrade package may be smaller than ten percent of the size of the new firmware) in comparison with the whole upgrade package, the terminal device can download the differential upgrade package in no time and use a small amount of spared memory to temporarily store the package.

In order to ensure the security of the terminal device, the current firmware of the terminal device may have been encrypted. However, the existing differential upgrade methods are incapable of upgrading encrypted firmware.

SUMMARY OF THE INVENTION

An object of the present disclosure is to provide a method for updating encrypted firmware. The method can upgrade encrypted firmware in a differential upgrade manner.

An embodiment of the method of the present disclosure is performed by a plurality of devices cooperatively. This embodiment includes the following steps: using a far-end device to store encrypted to-be-upgraded firmware and encrypted target firmware, wherein the far-end device is included in a server or independent of the server; using the far-end device to decrypt the encrypted to-be-upgraded firmware to obtain decrypted to-be-upgraded firmware, and using the far-end device to decrypt the encrypted target firmware to obtain decrypted target firmware; using to far-end device to perform a differential operation to the decrypted to-be-upgraded firmware based on the decrypted target firmware, and thereby generating a differential upgrade package; using the far-end device to encrypt the differential upgrade package and thereby generating an encrypted differential upgrade package which is then stored in the server, or using the far-end device to store the differential upgrade package in the server; using a terminal device to receive the encrypted differential upgrade package or the differential upgrade package from the server through a communication channel, wherein when the terminal device receives the encrypted differential upgrade package, the terminal device decrypts the encrypted differential upgrade package to obtain the differential upgrade package; using the terminal device to decrypt encrypted firmware of the terminal device to obtain decrypted firmware of the terminal device, wherein the encrypted firmware of the terminal device is equal to or equivalent to the encrypted to-be-upgraded firmware and the decrypted firmware of the terminal device is equal to or equivalent to the decrypted to-be-upgraded firmware; using the terminal device to generate the decrypted target firmware according to the decrypted firmware of the terminal device and the differential upgrade package; and using the terminal device to encrypt the decrypted target firmware to generate the encrypted target firmware, and then storing the encrypted target firmware in the terminal device.

Another embodiment of the method of the present disclosure is performed by a terminal device. This embodiment includes the following steps: using a terminal device to receive an encrypted differential upgrade package or a differential upgrade package through a communication channel, wherein when the terminal device receives the encrypted differential upgrade package, the terminal device decrypts the encrypted differential upgrade package to obtain the differential upgrade package; using the terminal device to decrypt encrypted to-be-upgraded firmware of the terminal device to obtain decrypted to-be-upgraded firmware of the terminal device; using the terminal device to generate decrypted target firmware according to the decrypted to-be-upgraded firmware of the terminal device and the differential upgrade package; and using the terminal device to encrypt the decrypted target firmware to generate encrypted target firmware, and then storing the encrypted target firmware in the terminal device.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present specification discloses a method for updating encrypted firmware. The method can upgrade encrypted firmware in a differential upgrade manner.

Figure 1:
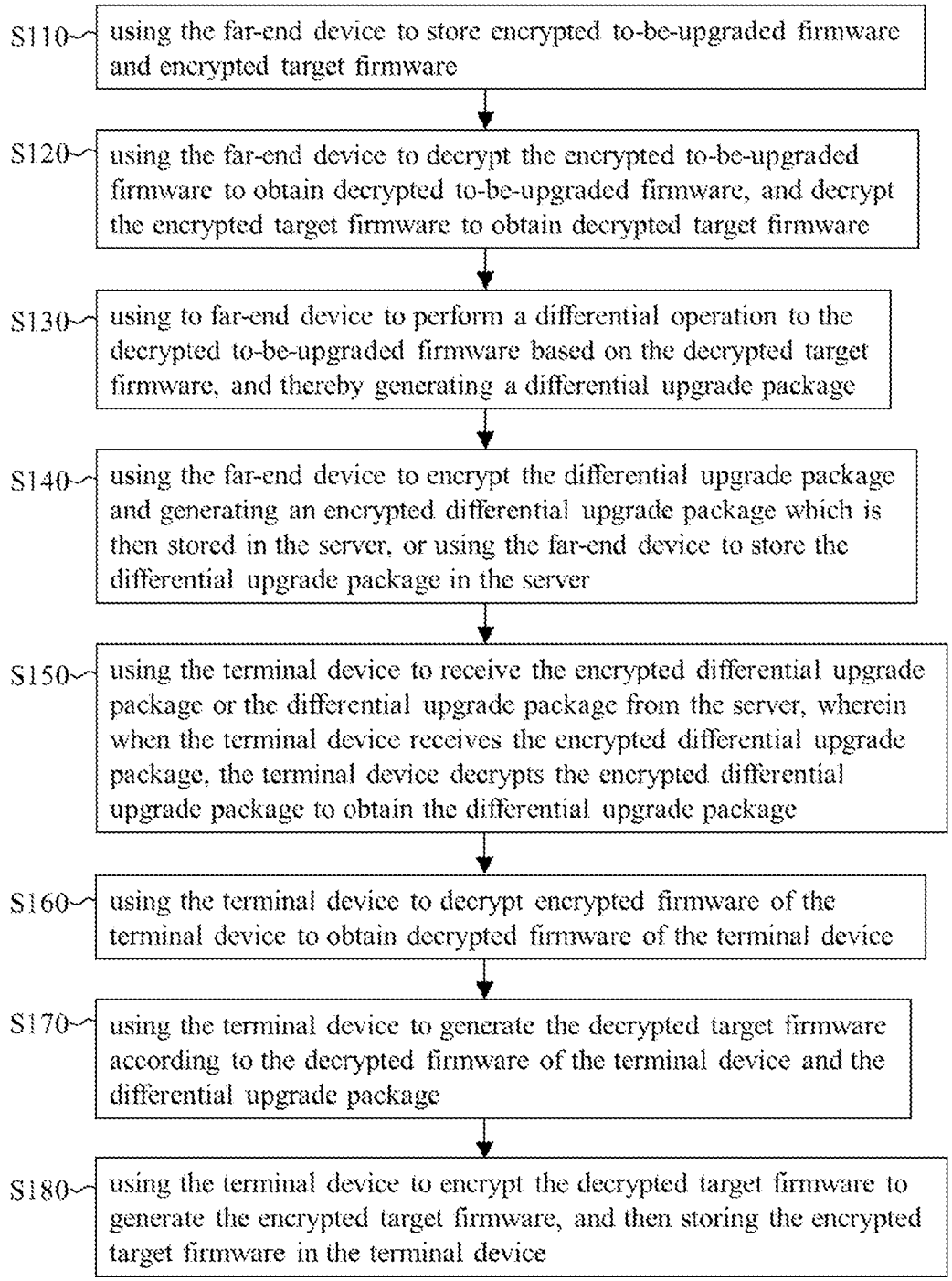
FIG. 1 shows the method for updating encrypted firmware according to an embodiment of the present disclosure.

FIG. 1 shows an embodiment of the method of the present disclosure. The embodiment of FIG. 1 is performed by a plurality of devices cooperatively. The plurality of devices include a far-end device, a server, and a terminal device, wherein the far-end device can be included in the server or be independent of the server. The embodiment of FIG. 1 includes the following steps:

S110: using the far-end device to store encrypted to-be-upgraded firmware and encrypted target firmware.

In an exemplary implementation, the far-end device is a circuit having decryption and encryption functions and storing the encrypted to-be-upgraded firmware and the encrypted target firmware. The far-end devices can obtain the above-mentioned encrypted firmware in a known/self-developed manner which has little to do with the present invention and falls beyond the scope of the present disclosure.

S120: using the far-end device to decrypt the encrypted to-be-upgraded firmware to obtain decrypted to-be-upgraded firmware, and using the far-end device to decrypt the encrypted target firmware to obtain decrypted target firmware.

The above-mentioned decryption can be realized with known/self-developed technologies which fall beyond the scope of the present disclosure.

S130: using to far-end device to perform a differential operation to the decrypted to-be-upgraded firmware based on the decrypted target firmware, and thereby generating a differential upgrade package.

The differential operation may be based on an algorithm such as the bsdiff algorithm, the hdiff algorithm, or another known/self-developed algorithm. The size of the differential upgrade package is far smaller than the size of the target firmware. For example, the size of the differential upgrade package is smaller than ten percent of the size of the target firmware.

S140: using the far-end device to encrypt the differential upgrade package and thereby generating an encrypted differential upgrade package which is then stored in the server, or using the far-end device to store the differential upgrade package in the server.

The above-mentioned encryption may be realized with known/self-developed technologies which fall beyond the scope of the present disclosure.

S150: using the terminal device to receive the encrypted differential upgrade package or the differential upgrade package from the server through a communication channel, wherein when the terminal device receives the encrypted differential upgrade package, the terminal device decrypts the encrypted differential upgrade package to obtain the differential upgrade package.

In an exemplary implementation, the communication channel is a wireless channel of a wireless communication network. The wireless communication network includes at least one of a wireless connection, a Bluetooth connection, and a mobile network connection, but the implementation of the present invention is not limited thereto. In addition, the decryption mentioned in step S150 can be realized with known/self-developed technologies which fall beyond the scope of the present disclosure.

S160: using the terminal device to decrypt encrypted firmware of the terminal device to obtain decrypted firmware of the terminal device, wherein the encrypted firmware of the terminal device is equal to or equivalent to the encrypted to-be-upgraded firmware and the decrypted firmware of the terminal device is equal to or equivalent to the decrypted to-be-upgraded firmware.

The above-mentioned decryption can be realized with known/self-developed technologies which fall beyond the scope of the present disclosure.

S170: using the terminal device to generate the decrypted target firmware according to the decrypted firmware of the terminal device and the differential upgrade package.

S180: using the terminal device to encrypt the decrypted target firmware to generate the encrypted target firmware, and then storing the encrypted target firmware in the terminal device.

It is noted that the encrypted target firmware generated by the terminal device takes the place of the encrypted firmware of the terminal device, which means the encrypted firmware of the terminal device is upgraded to the encrypted target firmware.

In an exemplary implementation of steps S110~S120 of FIG. 1, the encrypted to-be-upgraded firmware includes N encrypted blocks and further includes a header part and a data part, wherein the N is an integer greater than one. The header part includes a block partition message of the N encrypted blocks and a block size message of the N encrypted blocks. The far-end device decrypts the N encrypted blocks according to the block partition message and the block size message to obtain N decrypted blocks of the decrypted to-be-upgraded firmware, which is realized with known technologies of decryption. The above exemplary implementation may optionally include the following features: the N decrypted blocks include boot partition data of the data part and/or firmware partition data of the data part; and the header part is not encrypted. It is noted that: any two of the N decrypted blocks of the to-be-upgraded firmware can have the same size or have different sizes, and the size of each of the N decrypted blocks can be determined according to the amount of the spared storage space of the terminal device or determined according to other known/self-developed conditions (e.g., the unitary erase/write area of the storage media of the terminal device); however, the implementations of the present invention are not limited to the above features provided such implementations are practicable.

In an exemplary implementation of steps S110~S120 of FIG. 1, the encrypted target firmware obtained by the far-end device from the server includes N encrypted blocks and further includes a header part and a data part, wherein the N is an integer greater than one. The header part includes a block partition message of the N encrypted blocks and a block size message of the N encrypted blocks. The far-end device decrypts the N encrypted blocks according to the block partition message and the block size message to obtain N decrypted blocks of the decrypted target firmware. The above exemplary implementation may optionally include the following features: the N decrypted blocks include boot partition data of the data part and/or firmware partition data of the data part; and the header part is not encrypted. It is noted that: any two of the N decrypted blocks of the target firmware can have the same size or have different sizes, and the size of each of the N decrypted blocks can be determined according to the amount of the spared storage space of the terminal device or determined according to other known/self-developed conditions (e.g., the unitary erase/write area of the storage media of the terminal device); however, the implementations of the present invention are not limited to the above features provided such implementations are practicable. It is also noted that the size of a $K^{th}$ block of the N decrypted blocks of the to-be-upgraded firmware is the same as the size of a $K^{th}$ block of the N decrypted blocks of the target firmware, wherein the K is a positive not greater than the N; however, the implementations of the present invention are not limited to the above features provided the implementations are practicable.

Figure 2:
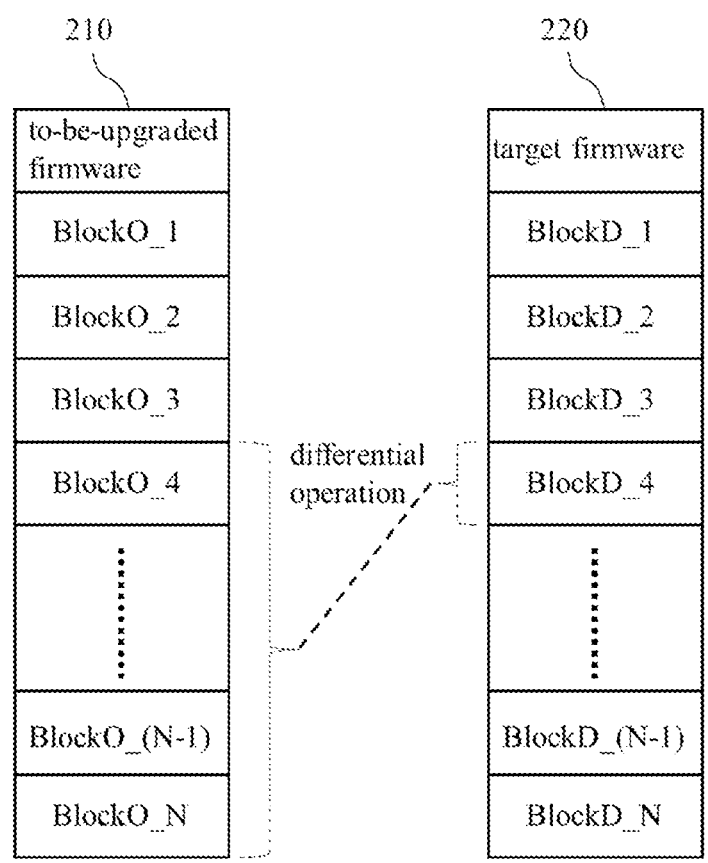
FIG. 2 shows an exemplary implementation of step S130 of FIG. 1.

FIG. 2 shows an embodiment of step S130 of FIG. 1. Referring to FIG. 2, the decrypted to-be-upgraded firmware 210 can be divided into a plurality of blocks (hereinafter referred to as "N to-be-upgraded blocks"). The N to-be-upgraded blocks include a first to-be-upgraded block, a second to-be-upgraded block, a third to-be-upgraded block, a fourth to-be-upgraded, . . . , an $(N-1)^{th}$ to-be-upgraded block, and an $N^{th}$ to-be-upgraded block (i.e., BlockO_1, BlockO_2, BlockO_3, BlockO_4, . . . , BlockO_(N−1), and BlockO_N in FIG. 2), wherein the N is an integer greater than one. The decrypted target firmware 220 can be divided into a plurality of blocks (hereinafter referred to "N target blocks"). The N target blocks include a first target block, a second target block, a third target block, a fourth target block, . . . , an $(N-1)^{th}$ target block, and an $N^{th}$ target block (i.e., BlockD_1, BlockD_2, BlockD_3, BlockD_4, . . . , BlockD_(N−1), and BlockD_N in FIG. 2). The differential operation includes a block-based differential operation between each of the N target blocks and at least a part of the N to-be-upgraded blocks BlockO_1~BlockO_N; for example, the differential operation includes N block-based differential operations in total, and each of the N block-based differential operations is devoted to determining the difference between a $K^{th}$ target block (e.g., the fourth target block BlockD_4 in FIG. 2) and (N−K+1) to-be-upgraded block(s) (e.g., the blocks from the fourth to-be-upgraded block BlockD_4 to the $N^{th}$ to-be-upgraded block BlockD_N in FIG. 2), wherein the K is a positive integer not greater than the N.

It is noted that in consideration of that the spared storage space of the terminal device could be insufficient, the decrypted to-be-upgraded firmware 210 is divided into the plurality of blocks and the decrypted target firmware 220 is divided into the plurality of blocks. Through the above-mentioned manner, steps S170~S180 of FIG. 1 can upgrade the plurality of blocks of the decrypted to-be-upgraded firmware one by one with the differential upgrade package and thereby prevent this upgrade operation from consuming too much storage space of the terminal device at a time. However, provided the spared storage space of the terminal device is sufficient, it is not necessary to divide the firmware into the plurality of blocks.

In an exemplary implementation of step S140 of FIG. 1, the differential upgrade package can be divided into one or more blocks (hereinafter referred to as "M block(s)"). The far-end device encrypts the M block(s) to generate an encrypted differential upgrade package. The encrypted differential upgrade package includes M encrypted block(s) and further includes a header part and a data part. The header part includes a block partition message of the M encrypted block(s) and a block size message of the M encrypted block(s), wherein the M is a positive integer. Since the size of the M encrypted block(s) of the differential upgrade package is significantly different from the size of the N to-be-upgraded blocks and significantly different from the size of the N target blocks, the relation between the M and the N may not be fixed. The above implementation may optionally include the following features: the M encrypted block(s) include(s) at least a part of boot partition data of the data part and/or at least a part of firmware partition data of the data part; the boot partition data are encrypted in a way different from the way to encrypt the firmware partition data; and the header part is not encrypted.

In an exemplary implementation of step S150 of FIG. 1, the terminal device receives the encrypted differential upgrade package from the server, and the encrypted differential upgrade package includes the M encrypted block(s), the header part, and the data part. The terminal device decrypts the M encrypted block(s) according to the block partition message of the header part the block size message of the header part, and thereby obtains the differential upgrade package.

In an exemplary implementation of step S160 of FIG. 1: the encrypted firmware of the terminal device (i.e., the firmware equal to or equivalent to the encrypted to-be-upgraded firmware) is stored in N storage blocks of the terminal device; and after the terminal device decrypts encrypted data of a $K^{th}$ storage block of the N storage blocks to generate $K^{th}$-storage-block decrypted data, the terminal device overwrites the encrypted data of the $K^{th}$ storage block with the $K^{th}$-storage-block decrypted data, then the terminal device decrypts encrypted data of a $(K+1)^{th}$ storage block of the N storage blocks to generate $(K+1)^{th}$-storage-block decrypted data and then overwrites the encrypted data of the $(K+1)^{th}$ storage block with the $(K+1)^{th}$-storage-block decrypted data, and so on and so forth, wherein the K is a positive integer smaller than the N. It is noted that the $K^{th}$-storage-block decrypted data are temporarily retained in the terminal device till the terminal device overwrites the encrypted data of the $K^{th}$ storage block with the $K^{th}$-storage-block decrypted data. It is also noted that the above block-based decryption operation in step S160 can avoid using too much storage space of the terminal device at a time; however, provided the spared storage space of the terminal device is sufficient, the block-based decryption operation may be replaced with a single decryption operation.

In an exemplary implementation of step S180 of FIG. 1: the decrypted firmware of the terminal device (i.e., the firmware equal to or equivalent to the decrypted to-be-upgraded firmware) is stored in N storage blocks of the terminal device; the decrypted target firmware is generated by the terminal device according to the decrypted firmware of the terminal device and the differential upgrade package, and includes N pieces of data; and after the terminal device encrypts a $K^{th}$ piece of data of the N pieces of data to generate a $K^{th}$ piece of encrypted data, the terminal device overwrites data of a $K^{th}$ storage block (i.e., the $K^{th}$-storage-block decrypted data mentioned in the preceding paragraph) of the N storage blocks with the $K^{th}$ piece of encrypted data, then the terminal device encrypts a $(K+1)^{th}$ piece of data of the N pieces of data to generate a $(K+1)^{th}$ piece of encrypted data and then overwrites data of a $(K+1)^{th}$ storage block of the N storage blocks (i.e., the $K^{th}$-storage-block decrypted data mentioned in the preceding paragraph) with the $(K+1)^{th}$ piece of encrypted data, and so on and so forth. It is noted that the above block-based decryption operation can avoid using too much storage space of the terminal device at a time; however, provided the spared storage space of the terminal device is sufficient, the block-based decryption operation may be replaced with a single decryption operation.

Another embodiment of the method of the present disclosure is performed with the terminal device and includes steps S150~S180 of FIG. 1. In comparison with FIG. 1, the present embodiment has no limitations on the way to generate the differential upgrade package; in other words, any method that can provide the differential upgrade package can be applied to the present embodiment. In an exemplary implementation of the present embodiment, the terminal device actively sends out an upgrade request packet to the server through a communication channel in order to receive the encrypted differential upgrade package or the differential upgrade package. For example, the terminal device actively provides information (e.g., information of a firmware version) of the encrypted firmware of the terminal device for the server to let the server decide whether to provide the encrypted differential upgrade package or the differential upgrade package to the terminal device in according with the information of the encrypted firmware of the terminal device and information of the target firmware of the server. In an exemplary implementation of the present embodiment, the terminal device does not send out any upgrade request packet, and passively receives the encrypted differential upgrade package or the differential upgrade package that is actively issued from the server. For example, the server learns and keeps the information of the firmware version of the terminal device and the information of the latest firmware version, and when the information of the latest firmware version is different from the information of the firmware version of the terminal device, the server actively issues the encrypted differential upgrade package or the differential upgrade package to the terminal device. Since those having ordinary skill in the art can refer to the embodiments of FIGS. 1~2 to appreciate the details and the modifications of the present embodiment, repeated and redundant description is omitted here.

It is noted that people having ordinary skill in the art can selectively use some or all of the features of any embodiment in this specification or selectively use some or all of the features of multiple embodiments in this specification to implement the present invention as long as such implementation is practicable; in other words, the way to implement the present invention is flexible based on the present disclosure.

To sum up, the method of the present disclosure can upgrade encrypted firmware in a differential upgrade manner.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A method for updating encrypted firmware, the method which is performed by a plurality of devices cooperatively including following steps:
using a far-end device to store encrypted to-be-upgraded firmware and encrypted target firmware, wherein the far-end device is included in a server or independent of the server;
using the far-end device to decrypt the encrypted to-be-upgraded firmware to obtain decrypted to-be-upgraded firmware, and using the far-end device to decrypt the encrypted target firmware to obtain decrypted target firmware;
using to far-end device to perform a differential operation to the decrypted to-be-upgraded firmware based on the decrypted target firmware, and thereby generating a differential upgrade package;
using the far-end device to encrypt the differential upgrade package and thereby generating an encrypted differential upgrade package which is then stored in the server, or using the far- end device to store the differential upgrade package in the server;
using a terminal device to receive the encrypted differential upgrade package or the differential upgrade package from the server through a communication channel, wherein when the terminal device receives the encrypted differential upgrade package, the terminal device decrypts the encrypted differential upgrade package to obtain the differential upgrade package;
using the terminal device to decrypt encrypted firmware of the terminal device to obtain decrypted firmware of the terminal device, wherein the encrypted firmware of the terminal device is equal to or equivalent to the encrypted to-be-upgraded firmware and the decrypted firmware of the terminal device is equal to or equivalent to the decrypted to-be-upgraded firmware;
using the terminal device to generate the decrypted target firmware according to the decrypted firmware of the terminal device and the differential upgrade package; and
using the terminal device to encrypt the decrypted target firmware to generate the encrypted target firmware, and then storing the encrypted target firmware in the terminal device.

2. The method of claim 1, wherein the communication channel is a wireless channel.

3. The method of claim 1, wherein the encrypted to-be-upgraded firmware includes N encrypted blocks and further includes a header part and a data part; the header part includes a block partition message of the N encrypted blocks and a block size message of the N encrypted blocks; the far-end device decrypts the N encrypted blocks according to the block partition message and the block size message to obtain N decrypted blocks of the decrypted to-be-upgraded firmware; and the N is an integer greater than one.

4. The method of claim 3, wherein the N decrypted blocks include boot partition data of the data part and firmware partition data of the data part, and the header part is not encrypted.

5. The method of claim 1, wherein the encrypted target firmware obtained by the far- end device from the server includes N encrypted blocks and further includes a header part and a data part; the header part includes a block partition message of the N encrypted blocks and a block size message of the N encrypted blocks; the far-end device decrypts the N encrypted blocks according to the block partition message and the block size message to obtain N decrypted blocks of the decrypted target firmware; and the N is an integer greater than one.

6. The method of claim 5, wherein the header part is not encrypted and the N decrypted blocks include at least one of following: boot partition data of the data part; and firmware partition data of the data part.

7. The method of claim 1, wherein the terminal device receives the encrypted differential upgrade package from the server; the encrypted differential upgrade package includes M encrypted blocks and further includes a header part and a data part; the header part includes a block partition message of the M encrypted blocks and a block size message of the M encrypted blocks; the terminal device decrypts the M encrypted blocks according to the block partition message and the block size message to obtain the differential upgrade package;
and the M is an integer greater than one.

8. The method of claim 7, wherein the header part is not encrypted and the M encrypted blocks include at least one of following: at least a part of boot partition data of the data part; and least a part of firmware partition data of the data part.

9. The method of claim 1, wherein the encrypted firmware of the terminal device is stored in N storage blocks of the terminal device; after the terminal device decrypts encrypted data of a $K^{th}$ storage block of the N storage blocks to generate $K^{th}$-storage-block decrypted data, the terminal device overwrites the encrypted data of the $K^{th}$ storage block with the $K^{th}$-storage-block decrypted data and then decrypts encrypted data of a $(K+1)_{th}$ storage block of the N storage blocks; and the K is a positive integer smaller than the N.

10. The method of claim 1, wherein the decrypted firmware of the terminal device is stored in N storage blocks of the terminal device; the decrypted target firmware generated by the terminal device includes N pieces of data; after the terminal device encrypts a $K^{th}$ piece of data of the N pieces of data to generate a $K^{th}$ piece of encrypted data, the terminal device overwrites data of a $K^{th}$ storage block of the N storage blocks with the $K^{th}$ piece of encrypted data and then encrypts a $(K+1)^{th}$ piece of data of the N pieces of data; and the K is a positive integer smaller than the N.

11. A method for updating encrypted firmware, the method which is performed by a terminal device including following steps:
    using a terminal device to receive an encrypted differential upgrade package or a differential upgrade package through a communication channel, wherein when the terminal device receives the encrypted differential upgrade package, the terminal device decrypts the encrypted differential upgrade package to obtain the differential upgrade package;
    using the terminal device to decrypt encrypted to-be-upgraded firmware of the terminal device to obtain decrypted to-be-upgraded firmware of the terminal device;
    using the terminal device to generate decrypted target firmware according to the decrypted to-be-upgraded firmware of the terminal device and the differential upgrade package; and
    using the terminal device to encrypt the decrypted target firmware to generate encrypted target firmware, and then storing the encrypted target firmware in the terminal device,
    wherein the encrypted differential upgrade package includes M encrypted blocks and further includes a header part and a data part; the header part includes a block partition message of the M encrypted blocks and a block size message of the M encrypted blocks; the terminal device decrypts the M encrypted blocks according to the block partition message and the block size message to obtain the differential upgrade package; and the M is an integer greater than one.

12. The method of claim 11, wherein the communication channel is a wireless channel.

13. The method of claim 11, wherein the header part is not encrypted and the M encrypted blocks include at least one of following: at least a part of boot partition data of the data part; and at least a part of firmware partition data of the data part.

14. The method of claim 13, wherein the boot partition data are encrypted in a way different from the way to encrypt the firmware partition data.

15. The method of claim 11, wherein the encrypted to-be-upgraded firmware of the terminal device is stored in N storage blocks of the terminal device; after the terminal device decrypts encrypted data of a $K^{th}$ storage block of the N storage blocks to generate $K^{th}$-storage-block decrypted data, the terminal device overwrites the encrypted data of the $K^{th}$ storage block with the $K^{th}$-storage-block decrypted data and then decrypts encrypted data of a $(K+1)^{th}$ storage block of the N storage blocks; and the K is a positive integer smaller than the N.

16. The method of claim 15, wherein the decrypted to-be-upgraded firmware of the terminal device is stored in N storage blocks of the terminal device; the decrypted target firmware is generated by the terminal device according to the decrypted to-be-upgraded firmware of the terminal device and the differential upgrade package, and includes N pieces of data; and after the terminal device encrypts a $K^{th}$ piece of data of the N pieces of data to generate a $K^{th}$ piece of encrypted data, the terminal device overwrites data of the $K^{th}$ storage block of the N storage blocks with the $K^{th}$ piece of encrypted data and then encrypts a $(K+1)^{th}$ piece of data of the N pieces of data.

17. The method of claim 11, wherein the decrypted to-be-upgraded firmware of the terminal device is stored in N storage blocks of the terminal device; the decrypted target firmware is generated by the terminal device according to the decrypted to-be-upgraded firmware of the terminal device and the differential upgrade package, and includes N pieces of data; and after the terminal device encrypts a $K^{th}$ piece of data of the N pieces of data to generate a $K^{th}$ piece of encrypted data, the terminal device overwrites data of a $K^{th}$ storage block of the N storage blocks with the $K^{th}$ piece of encrypted data and then encrypts a $(K+1)^{th}$ piece of data of the N pieces of data; and the K is a positive integer smaller than the N.

18. The method of claim 11, wherein the terminal device actively sends out an upgrade request packet through the communication channel in order to receive the encrypted differential upgrade package or the differential upgrade package.

19. The method of claim 11, wherein the terminal device does not send out any upgrade request packet, and passively receives the encrypted differential upgrade package or the differential upgrade package through the communication channel.

* * * * *